(No Model.)

N. HUNEYCUTT & T. E. MOSELEY.
CULTIVATOR AND SCRAPER.

No. 461,115. Patented Oct. 13, 1891.

WITNESSES:
A. L. Southerland
W. A. Redmond

INVENTORS
Noah Huneycutt
Thomas E. Moseley
BY J. F. Beale
ATTORNEY.

THE NORRIS PETERS CO., PHOTO-LITHO., WASHINGTON, D. C.

UNITED STATES PATENT OFFICE.

NOAH HUNEYCUTT AND THOMAS ELVERTON MOSELEY, OF GAINESVILLE, TEXAS.

CULTIVATOR AND SCRAPER.

SPECIFICATION forming part of Letters Patent No. 461,115, dated October 13, 1891.

Application filed July 5, 1890. Serial No. 357,746. (No model.)

*To all whom it may concern:*

Be it known that we, NOAH HUNEYCUTT and THOMAS ELVERTON MOSELEY, citizens of the United States, residing at Gainesville, in the county of Cook and State of Texas, have invented certain new and useful Improvements in Cultivators and Scrapers; and we do hereby declare the following to be a full, clear, and exact description of the invention, such as will enable others skilled in the art to which it appertains to make and use the same.

Our invention relates to cultivators and scrapers for cotton, corn, or other plants.

The object of our invention is to provide a cultivator and scraper of simple and economical construction, which shall in one operation effectually scrape the surface of the ground at the side of the row, freeing it of grass or other growth and deflecting such growth or rubbish to the center between the rows and covering the same with earth, and subsequently supplying fresh earth to the rows.

Figure 1:
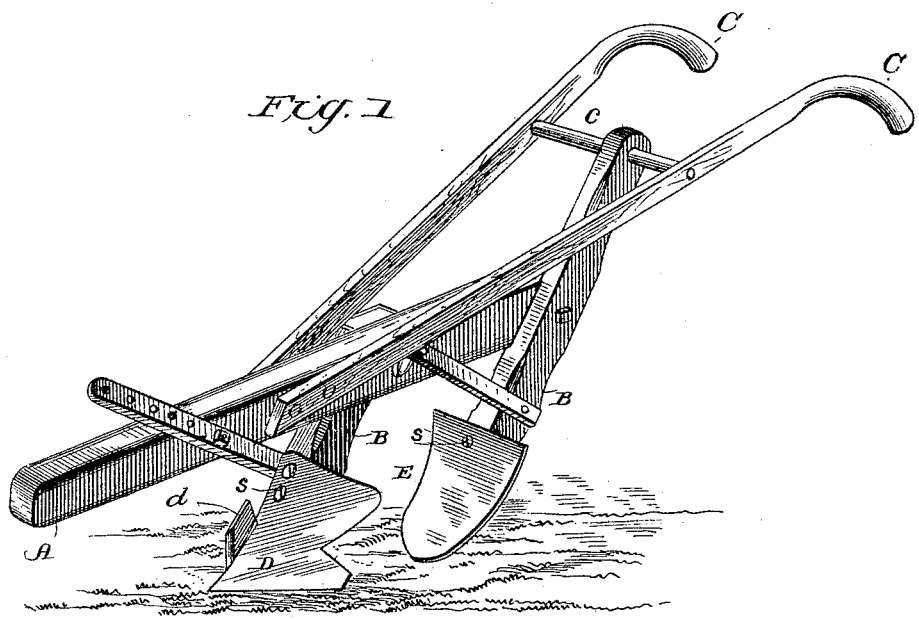
Figure 2:
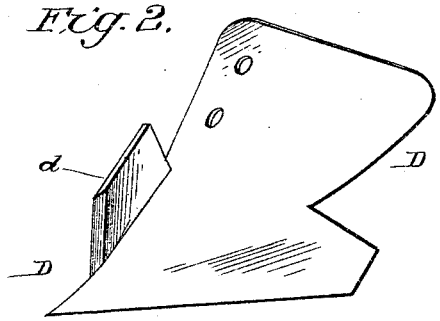

In the accompanying drawings, Figure 1 is a perspective view, and Fig. 2 is a detail view, of the scraper.

A denotes the beam.

B B' denote the standards.

C denotes the handles, and c a supporting-brace for said handles.

D denotes the scraper, secured to the forward or right-hand standard, having a lip or fender d.

R R' denote brace-rods, and E denotes the shovel-plow secured to the rear or left-hand standard.

As shown in the drawings, the standards are secured to the beam on opposite sides by suitable bolts. The rear or left-hand standard is elongated to receive and support the brace c for the handles. The scrapers and shovel are secured to the standards by bolts s.

As shown in Fig. 2, the scraper D is made of one piece of metal, having a vertical fender d raised upon its inner edge about two inches from the point. Said fender has a beveled cutting-edge at its lower or front end, forming an obtuse angle with the point of the scraper, the object of which is to aid or facilitate the cutting of roots, &c., as they are forced up upon said cutting-edge. Said fender also serves to prevent the escape of the grass, roots, &c., on the inner side, the slant or curve of the scraper deflecting the same to the center between the rows, where it is covered by the shovel-plow, which follows. Said fender also serves to prevent the cotton from falling over until the shovel-plow following dirts the cotton or corn. The fender d is made integral with the scraper, and the beveled cutting-edge of the fender forms an unbroken line with the upper cutting-edge of the scraper, the cutting-edge of the fender, forming an obtuse angle with the point or upper cutting-edge of the scraper, giving a double-draw cut to grass, roots, &c. The shovel E is secured to the rear or left-hand standard and follows the scraper at a distance of about fifteen inches to the rear and four or five inches to the right of the same, so that the grass, rubbish, &c., as they leave the share of the scraper, are caught by the right-hand share of the shovel and turned under the earth displaced by the same. The brace-rod R is secured to the inside of the forward or right-hand standard about three inches above the plow and projects above the beam, having several bolt-holes to admit of adjusting the scraper deep or shallow.

It is evident that our scraper can be made independent of the cotton-cultivator and used as a separate implement for attachment to different cultivators or other implements, or could be used separately.

Having shown and described our invention, what we claim, and desire to secure by Letters Patent, is—

The scraper D, having the lip or fender d made integral and raised vertically from the inner or upper edge of the scraper, the beveled edge of the fender d forming a continuous line or edge with the upper cutting-edge of the scraper and forming an obtuse angle therewith, substantially as shown and described.

In testimony whereof we affix our signatures in presence of two witnesses.

NOAH HUNEYCUTT.
THOMAS ELVERTON MOSELEY.

Witnesses:
J. E. HAYWORTH,
GEORGE BROWN.